June 23, 1942.　　H. S. EASTON ET AL　　2,287,344
FILTER
Filed Jan. 22, 1940　　2 Sheets-Sheet 1

Inventor
Harold S. Easton
Cecil G. Vokes
by
Attorney

June 23, 1942.  H. S. EASTON ET AL  2,287,344
FILTER
Filed Jan. 22, 1940   2 Sheets-Sheet 2

Inventor
Harold S. Easton
Cecil G. Vokes
by
Attorney

UNITED STATES PATENT OFFICE 2,287,344

FILTER

Harold Sidney Easton and Cecil Gordon Vokes, London, England

Application January 22, 1940, Serial No. 315,110
In Great Britain February 7, 1939

7 Claims. (Cl. 210—183)

There are many circumstances in which it is desirable to permit a filter to be by-passed or short-circuited in case its resistance to the flow of the material being filtered exceeds a permissible maximum.

An example of such a filter is shown in specification No. 2,145,535, the whole filter unit being arranged to move bodily to permit by-passing to take place at a tubular sliding inlet to the unit. In such an arrangement the assembly and clamping together of the parts of the filter casing cannot readily be done by the use of a single central tie without having a sliding fit between two parts in such a position that increasing back pressure as the filter becomes choked will tend to force any accumulation of dust or sludge (which should be by-passed as completely as possible) into the sliding joint or through it from the "dirty" to the "clean" side of the filter.

In other connections it is not uncommon to have a filter unit traversed by a tube giving access to the interior of the unit.

The nature of the present invention will be understood from the following description of a typical form of filter unit and filter embodying the new or improved features, combinations and arrangements.

The improved filter unit has a through passage (or possibly in some cases more than one passage) which traverses the unit without giving access to that portion of the unit which is enclosed by filtering material and to which access is given separately. This form of unit can itself be held together economically by a tube defining the through passage and can be readily movable on a structural element of the outer filter casing without undesirable tight sliding joints or danger of leakage. Assembly and replacement of units is thus facilitated and, in particular, when applied to a filter with a by-pass a central tie bolt can be used to clamp together the parts of the outer filter casing. The term "bolt" is used herein in a wide sense to include suitable ties of any solid or hollow cross-sections and adapted for clamping or tightening by any suitable means.

Typical forms of the invention as applied to an "inside to out" liquid filter are illustrated by the accompanying drawings, in which.

Figure 3:
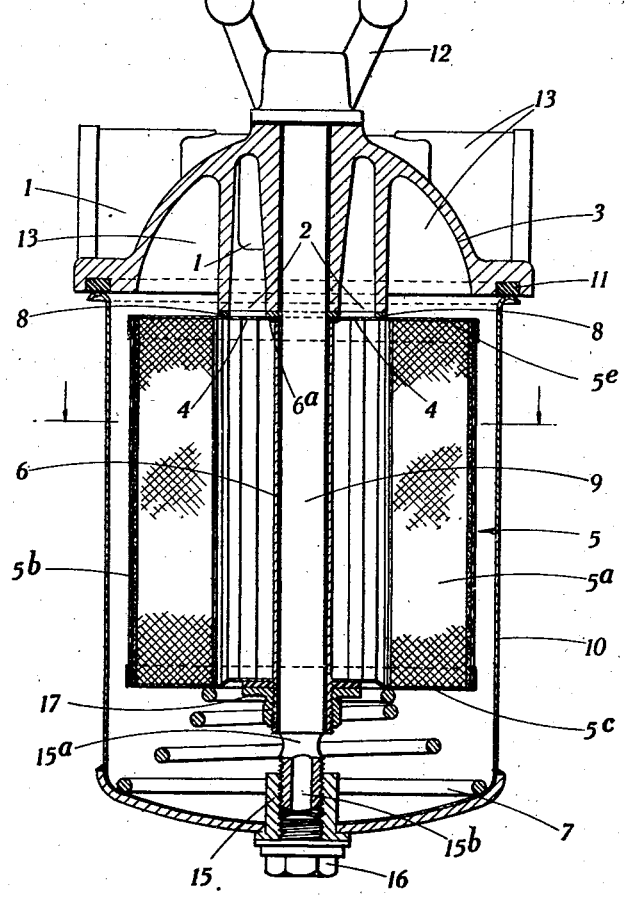
Figure 4:
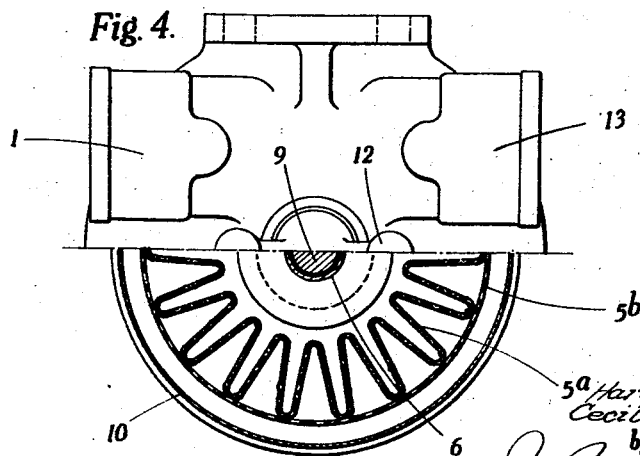

Fig. 3 a sectional elevation of an alternative form, and,

Fig. 4 a partly sectional plan of the form of Fig. 3.

Figure 1:
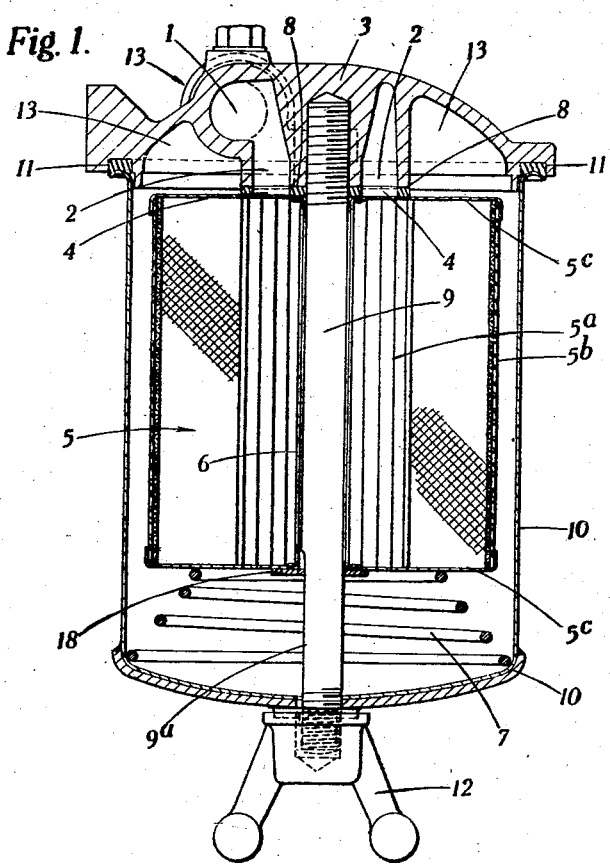
Fig. 1 is a sectional elevation.
Figure 2:
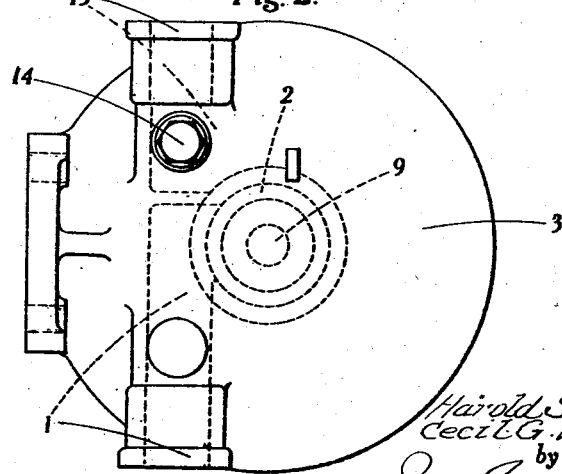
Fig. 2 is a plan view.

Referring first to Figs. 1 and 2, the liquid can be brought by inlet 1 to an annular port 2 formed in the cover 3 of the outer casing against which ports 4 in the end of the unit 5 surrounding a central through tube 6 are pressed by a spring 7 bearing upon the other end. Jointing material 8 can be cemented in place on the unit. The tube can if desired be extended to form a guide in a central recess or bore in the cover but it is not so shown. The tie bolt 9 is centrally attached to the inside of the cover. It passes through the tube, and the main shell 10 of the outer casing is clamped against jointing material 11 carried by the cover, by an external wing nut 12. The outlet 13 is then also conveniently formed in the cover, and the spring pressure is afforded by the compression spring 7 lying between the outer shell and the adjacent end of the unit. It will be observed that in this arrangement the central tube does not form any part of the main path of the oil, and that in case the unit moves owing to excess back pressure the by-pass action will be wholly or mainly direct from the annular inlet port 2 to the outlet 13 in the cover.

In order to ensure that the unit 5 cannot be placed upside down on the bolt 9 in case it has been removed for cleaning or when a replacement unit is being inserted, a flat is formed on the bolt at 9a and a correspondingly shaped disc 18 is sweated to the end of the unit, or other means provided to prevent the unit from being pushed onto the bolt wrong end first. An air release plug is provided at 14.

Referring now to Figs. 3 and 4, the general arrangements of the inlet and outlet and packing are similar and the parts are similarly marked. The bolt 9 is, however, permanently screwed into a ferrule 15 welded to the bottom of the shell 10. A tommy-hole 15a in the bolt is met by a drain hole 15b and the ferrule closed by a drain plug 16.

In each case the unit may utilize any suitable filtering material: a preferred form of unit comprises a star shaped or deeply pleated filtering wall 5a and a perforated casing 5b between end caps 5c. As shown in Fig. 1, the caps are permanently fixed to the tube, while as shown in Fig. 3 the caps are clamped between a flange 6a at one end of the tube and a flanged nut 17 screwed onto the other end. This makes it easy to replace the actual filtering wall if desired instead of necessarily scrapping and replacing the whole unit 5.

We claim:

1. A filter including a filter unit having end plates, a tube connected to the end plates and traversing and forming an imperforate passage through the unit, filtering material surrounding the tube, the unit being formed with port means outside the tube giving access to the interior space of the unit, an enclosure containing the unit and defining inlet and outlet passages, a bolt upon which the tube is slidably mounted, and resilient means normally holding the port means of the unit in register with the appropriate inlet passage, the arrangement being such that excessive back pressure moves the unit on the bolt against the resilient means and thereby by-passes the filtering material.

2. A filter unit comprising end pieces, a tube connecting and forming an imperforate passage between the end pieces, a filtering screen between the end pieces and surrounding and spaced from the tube, one of the end pieces being ported to give access to the space between the tube and the filtering screen.

3. A filter comprising an enclosing casing providing inlet and outlet passages, a tie bolt maintaining the assembly of the casing, a filter unit having end plates and formed with end ports, a tube connected to the end plates and traversing and forming an imperforate passage through the filter unit and slidably mounted on the tie bolt, and resilient means to hold the filter unit normally with its end ports in sealed communication with the inlet passage.

4. A filter unit comprising end caps, one of which is ported, a star-shaped filtering screen mounted between the end caps, reticulated material enclosing the filtering screen, and a tube connected to the end caps open at both ends and extending as an imperforate passage from end cap to end cap.

5. A filter unit comprising end caps, one of which is ported, a star-shaped filtering screen mounted between the end caps, reticulated material enclosing the filtering screen, and a tube connected to the end caps open at both ends and extending as an imperforate passage from end cap to end cap with jointing material surrounding the tube opening and secured to the ported end cap.

6. A filter comprising an outer casing, the said casing including a shell, a cover formed to provide concentrically arranged inlet and outlet passages, and a tie bolt holding the cover to the shell, together with a filter unit formed with a ported end registering with the inlet passage, a central tube traversing without giving access to the interior of the unit and slidably engaging the tie bolt and resilient means normally holding the ported end in fluid-tight contact with the inlet passage, and end caps forming part of the filter unit, and to which the tube is connected.

7. A filter comprising an outer casing, the said casing including a shell, a cover formed to provide concentrically arranged inlet and outlet passages, and a tie bolt holding the cover to the shell, together with a filter unit formed with a ported end registering with the inlet passage, a central tube traversing without giving access to the interior of the unit and slidably engaging the tie bolt and resilient means normally holding the ported end in fluid-tight contact with the inlet passage, means being provided to insure the unit being mounted on the tie bolt with its ported end facing the inlet passage, and end caps forming part of the filter unit, and to which the tube is connected.

HAROLD SIDNEY EASTON.
CECIL GORDON VOKES.